Aug. 20, 1957 M. MAUL 2,803,404

RECORD CARD SORTING MACHINES

Filed June 30, 1952 5 Sheets-Sheet 1

Iventor:
Michael Maul
By [signature]

Aug. 20, 1957 M. MAUL 2,803,404

RECORD CARD SORTING MACHINES

Filed June 30, 1952 5 Sheets-Sheet 2

Iventor:
Michael Maul

By [signature]

Iventor:
Michael Maul
By [signature]

Aug. 20, 1957 M. MAUL 2,803,404

RECORD CARD SORTING MACHINES

Filed June 30, 1952 5 Sheets-Sheet 4

Iventor:
Michael Maul
By [signature]

Iventor:
Michael Maul
By

United States Patent Office 2,803,404

Patented Aug. 20, 1957

2,803,404

RECORD CARD SORTING MACHINES

Michael Maul, Schwabach, near Nurnberg, Germany

Application June 30, 1952, Serial No. 296,423

Claims priority, application Germany July 3, 1951

6 Claims. (Cl. 235—61.11)

In record cards index marking is frequently effected in a plurality of rows arranged above each other said rows being designated as record decks, each deck consisting of a plurality of adjacent columns. If the record cards are in the form of perforated cards, a plurality of perforation decks, each consisting of a plurality of adjacent perforation columns is referred to.

In sorting machines for record cards it is now customary to construct the analyzing device so as to be displaceable column by column so that it may be adjusted at will on to the column on which sorting of the cards is to be carried out. If cards having a plurality of record decks are involved the analyzing device can be rendered effective selectively for any one of the plurality of decks by a "deck selector."

Various possibilities for deck selection have already become known. It is possible for instance to construct an analyzing device, which is common to all decks, in such a way that it is displaceable bodily in the card feeding direction so that it will respond to different decks of the card each time the latter is subjected to the analysis on one and the same position of the analyzing means. Deck selection by bodily displacement of the analyzing device can be effected in the case of electrical as well as in the case of mechanical analysis of the card. It is, however, also known to effect deck selection without displacing the analyzers bodily in the card feeding direction: In electrically operating machines the analysis is rendered effective by the deck selector at different times during the passage of a card under the analyzing device so that depending on the deck selection always only one of the different decks of the card is subjected to the analysis. In the case of a mechanical analyzing device the deck selection can be effected in such manner that the card is arrested by a stop in different positions relative to the analyzing device so that also in this instance different decks can be analyzed by the same analyzing means. Deck selection can however also be effected in such way that an individual analyzing device is associated with each of the various decks and that, depending on the deck selection, only one of said analyzing devices can be rendered effective at one time.

In all known arrangements, however, deck selection takes place independently of the column selection so that in any case two manual setting operations are required. By means of the deck selector the particular deck on which sorting is to be effected must be determined and through a second adjusting operation the analyzing device must be set to the desired column—for instance by a manually operated crank.

According to the invention column selection of all columns of all decks can be effected by a single setting operation in that upon the passage of the column selector from a column of one deck to a column of another deck an automatic running back of the analyzing device as well as deck selection are effected simultaneously. For this purpose the drive for the column selector extends over the plurality of record decks, the analyzing device is moved backward in the opposite diretcion at the end of a deck and upon this reverse movement the deck selection of the analyzing device is automatically effected in such a way that the analyzing device will be rendered effective for the subsequent record deck.

The invention may be used for any method of deck selection. It is, however, applicable with particular advantage to that type of machines wherein the analyzing device can be moved back and forth column by column over the card by means of a driving spindle and in such constructions the reverse movement is obtained by having the spindle always driving in the same direction, and at the end of a card deck, reversing the drive of the spindle automatically by means of a reversing gear, so that the analyzing device is moved by the driving spindle in the opposite direction. The change of deck takes place simultaneously with the shifting of the reversing gear.

In the case of the electrical analysis of record cards, the automatic deck selection preferably renders the analyzing device effective at different times during the passage of the card. In the case of the mechanical analysis of perforated cards the automatically displaced deck selection means will preferably control the insertion of stops in the card path for stopping the card during the analysis.

Further features of the invention as well as some preferred embodiments are disclosed in the following specification, the drawings and the claims:

Figure 1:
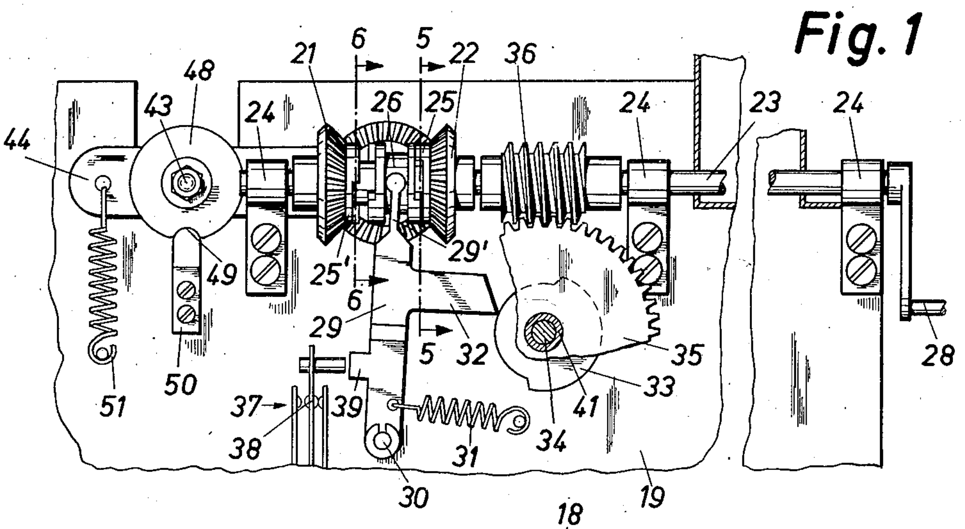
Figs. 1 and 2 show an electrical analyzing device for sorting machines with automatic deck selection according to the invention, Fig. 1 being a front view and Fig. 2 showing the arrangement in plan.
Figure 6:
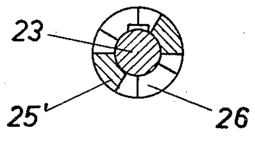
Figure 5:
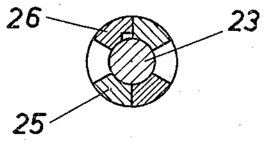

Figs. 5 and 6 show the clutch device of the reversing means, in section on line 5—5 and line 6—6 of Fig. 1 across the axis.

An analyzing device according to the invention wherein perforated cards are analyzed by analyzing pins is shown in Figs. 7 to 10.

Figure 7:
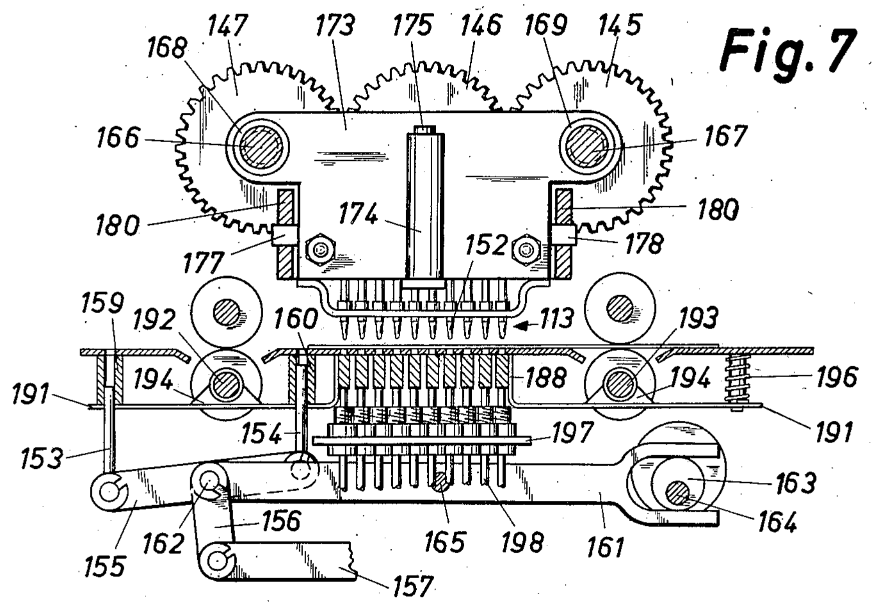

Fig. 7 shows a section through this analyzing device.

Figure 8:
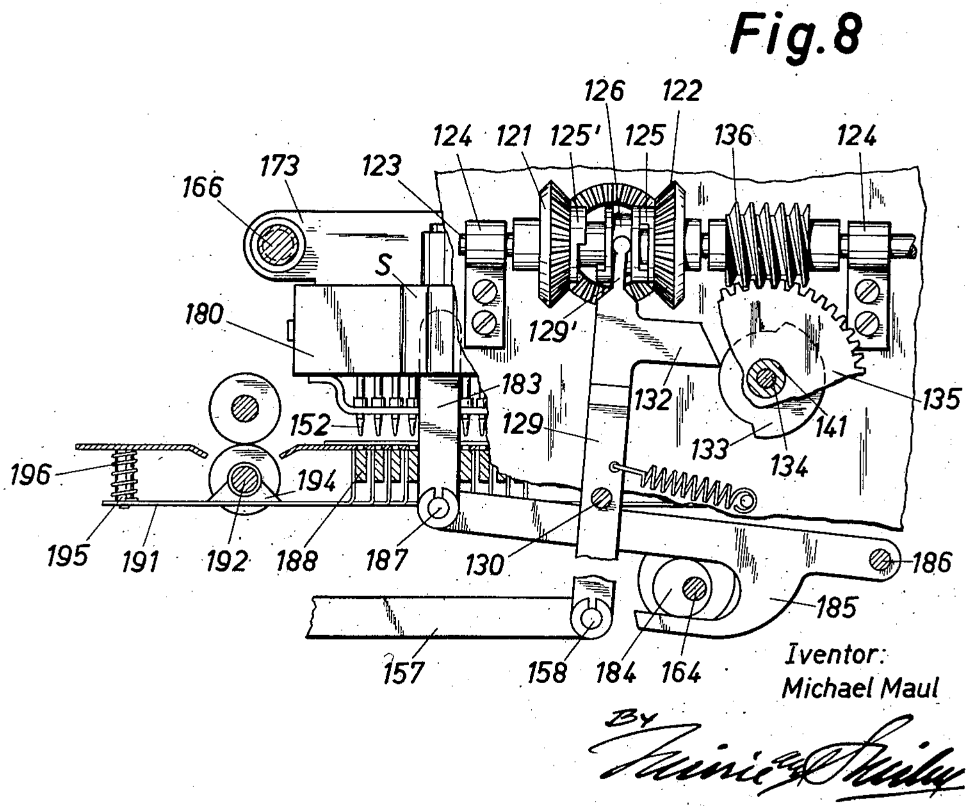

Fig. 8 shows the reversing gear as well as its drive in elevation.

Figure 9:
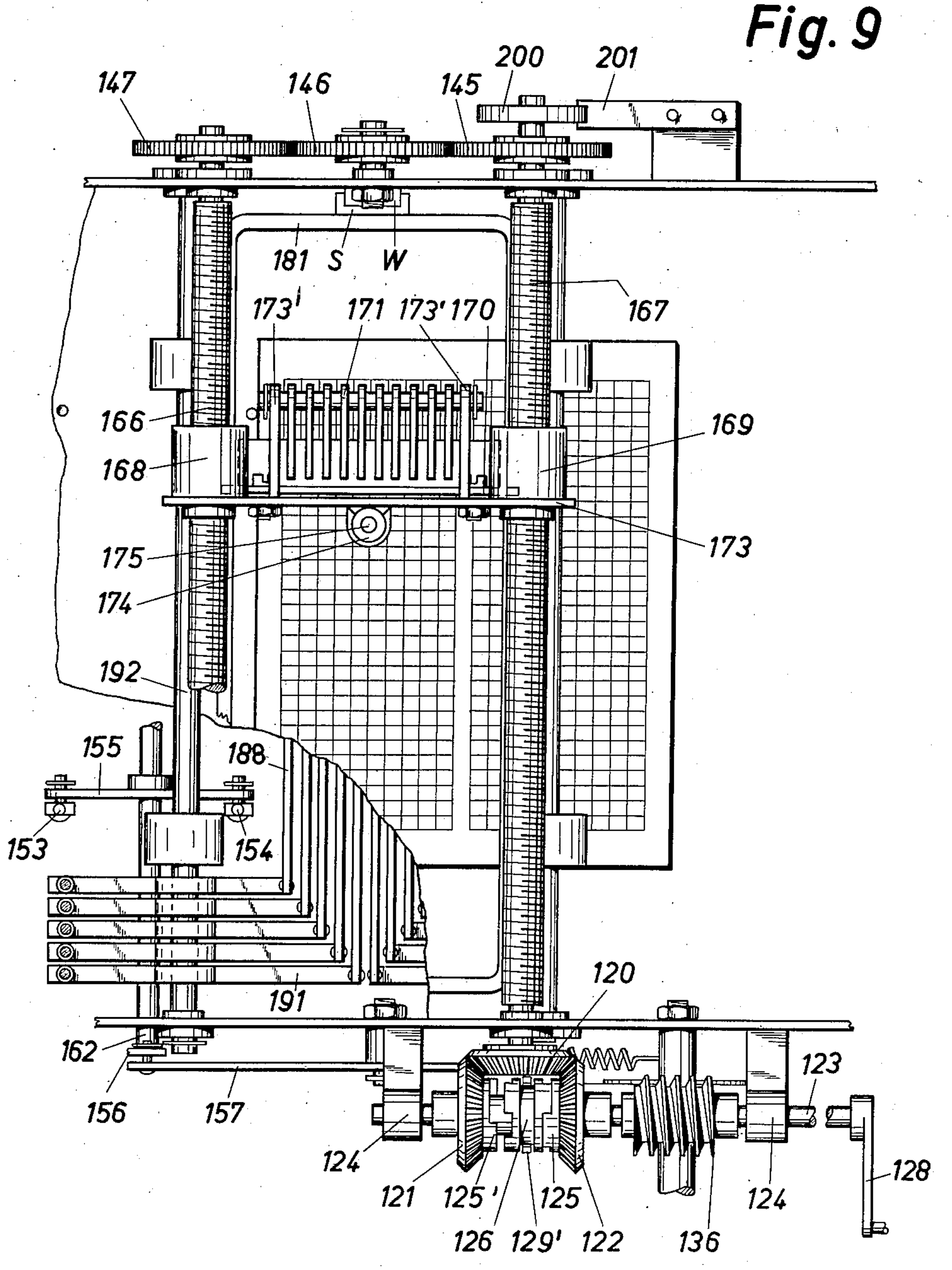

Fig. 9 shows the whole analyzing device in plan, while

Figure 10:
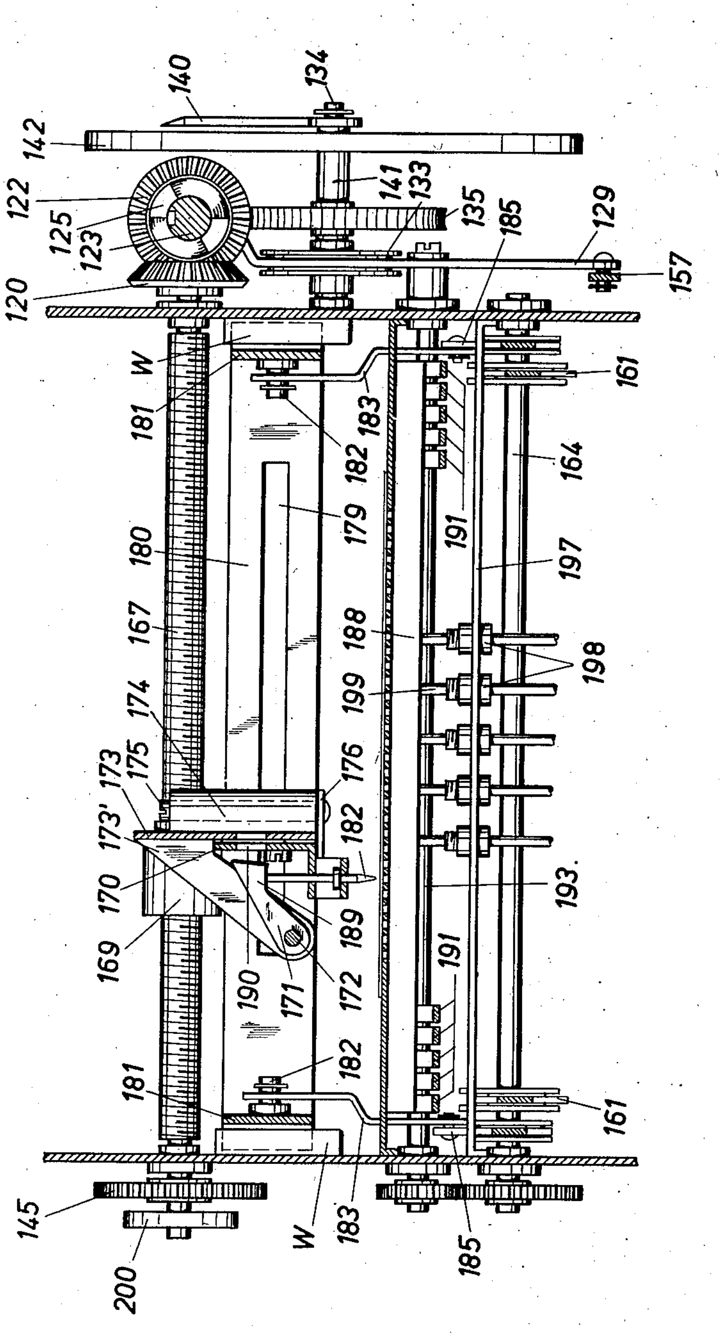

Fig. 10 shows a section through this analyzing device transversely of the sorting machine.

Figure 2:
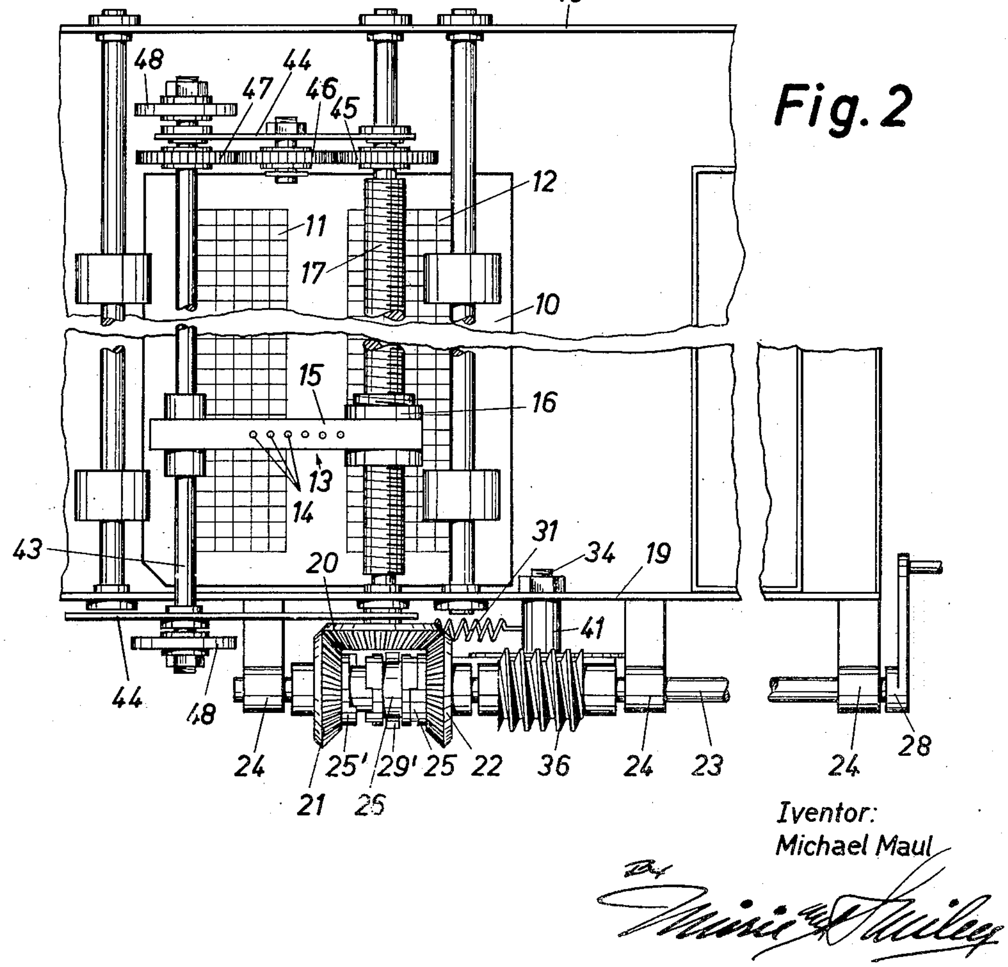

Referring now more particularly to that embodiment of the invention shown in Figures 1–6, wherein an electrical sensing system is utilized, it will be understood that the machine contemplated in this invention is generally similar to the machine shown in the patent to Maul, No. 2,265,440. That is, suitable mechanism is provided for moving the individual cards, one of which is indicated by the reference character 10 in Fig. 2, through the machine and there is also provided suitable means for timing the sensing or analyzing means with the movement of the cards, and this latter means is capable of being altered or adjusted by mechanism hereinafter described so that one of the selected decks or fields are for example those indicated by reference characters 11 and 12 in Fig. 2, are registered or positioned properly below the sensing or analyzing device in timed relation therewith.

Figure 4:
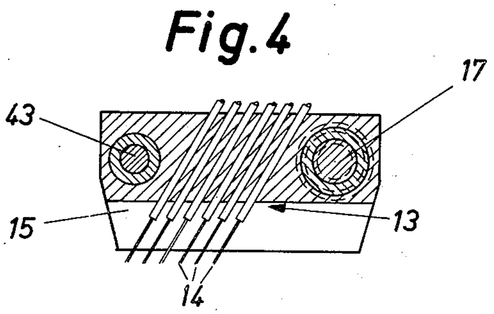
Fig. 4 is a section through the carrier for the analyzing brushes.

The sensing or analyzing device of the present invention is indicated generally by the reference character 13 and as seen most clearly in Figures 2 and 4 includes a plurality of depending contacts or brushes 14 which are supported by a barlike member 15. The member 15 has provided at one end thereof a nut member 16 engaged upon a worm shaft 17 which is journaled at its opposite ends in frame members 18 and 19. Fixed to one end of the worm shaft 17 is a bevel gear 20 which is constantly in mesh with a pair of bevel drive gears 21 and 22, the drive gears being journaled upon a drive shaft member 23 mounted on the frame by a series of suitable bearings 24.

The drive gears 21 and 22 have dog elements 25 and 25' integral therewith, which dog elements are selectively engaged with a dog clutch member 26 which is fixed for rotation with but slidable along the drive shaft 23. The clutch 26 and the associated dogs 25 and 25' of the two drive gears 21 and 22 are so dimensioned that one or the other but not both of the drive gears is constantly fixed for rotation with the drive shaft 23. Since the drive gears engage opposite sides of the driven bevel gear 20, it can be seen that the rotation of the worm 17 is reversed when the clutch element 26 is switched from engagement with one drive gear to the other. Thus, rotation of the drive shaft 23 in one direction, as for example, by means of the manually actuated crank 28 thereon, will cause the nut 16 to move from one end of the worm to the other under the positive drive of one of the gears 21 and 22 and then can be moved back to its original position by merely shifting the clutch element 26 to engage the other drive gear.

The mechanism for shifting the clutch 26 includes the fork 29 which is engaged at its upper end 29' with the clutch element, as shown most clearly in Figures 1 and 2, the lower end of this fork being pivoted as by a pin 30 to the frame element 19. A spring 31 applies tension to the fork element as will be seen most clearly in Figure 1 so as to normally bias the same in a direction to shift the clutch 26 into engagement with bevel gear 22. The fork 29 includes a laterally extending arm 32 which is engaged against a cam member 33 journaled upon a shaft or pin 34 fixed to the frame 19.

The cam 33 is so formed as to provide through substantially half its circumference a cam face of constant radius which permits the clutch 26 to remain in engagement with the drive gear 22, whereas the other half of the circumference of the cam 33 is provided with a cam surface of larger fixed radius so as to maintain the clutch 26 in engagement with the drive gear 21. There are, of course, transitional cam surfaces to smoothly effect the shifting of the clutch 26 from one drive gear to the other.

Also journaled upon the shaft 34 and fixed to the cam 33 is a worm wheel 35 which, in turn, is in mesh with a worm 36 feathered upon the drive shaft 23. Thus, rotation of the drive shaft 23 will effect rotation of the worm wheel 35 and cam 33 as well as one of the drive gears 21 or 22 as dictated by the position of the cam 33 and a corresponding movement of the sensing means 13 transversely of the record card 10. The lead of the worm 17 is so fixed that upon one complete revolution of the drive shaft 23, the sensing means will traverse a distance sufficient to align it above the next adjacent record column in the associated deck of the record cards 10.

On the other hand, the gear ratio between the worm 36 and worm wheel 35 is so chosen as to provide at the end of each direction of travel of the sensing means an idle cycle for deck shifting or timing. During this idle cycle, the sensing means continues in its previous direction of travel to a point beyond the last record column at the associated end of the card and at this point, the shifting of the clutch element 26 from one drive gear 21 or 22 to the other is completed so that the next complete rotation of the drive shaft 23 will reverse the movement of the sensing means and will bring it into alignment with the last record column of the other deck.

The deck shifting or timing is accomplished by virtue of a switch mechanism indicated generally by the reference character 37 which includes a movable contact 38 shiftable by means of an arm portion 39 of the fork 29 as the latter is moved to shift the clutch element 26 from one gear to the other, the movable contact 38 being normally biased as is shown in Figure 1 into engagement with the right hand contact of the switch 37. The mechanism actuated in response to actuation of the switch 37 for effecting the deck shifting operation is not shown in detail since the same can be readily constructed as in conventional machines with manual deck selection. Such machines are, for example, shown in Patents 2,209,414 and 2,265,440, to which the analyzing or sensing device according to this invention may be readily applied. The shifting switch 37 of this invention assumes the same function as the contacts 64_a_, 64_b_ of the first mentioned patent, and the shift contact 22 of the last mentioned patent.

Assuming, for example, a two deck card with each deck containing thirty record columns, the ratio between the worm 36 and worm wheel 35 would be 1:62 so as to provide an idle deck shifting operation at each end of the path of movement of the sensing means 13.

Figure 3:
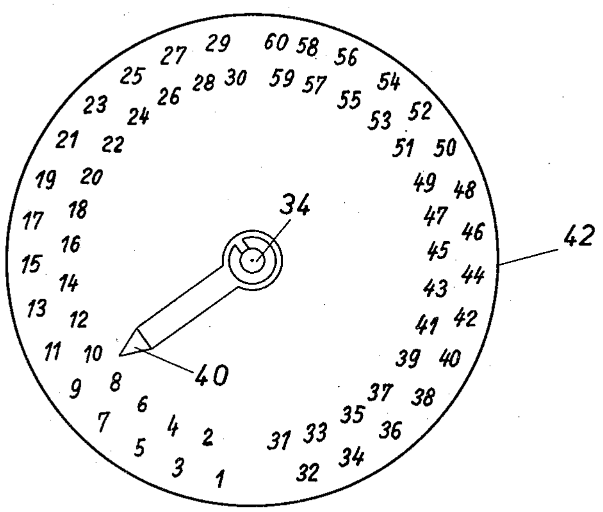
Fig. 3 shows the column indicating means.

As shown most clearly in Figure 3, a pointer 40 is fixed for common rotation with the worm wheel 35 and cam 33, all of which are fixed to a collar member 41 journaled on the shaft 34 and the pointer 40 moves over a fixed disk 42 having the indicia markings as noted thereon to apprise the operator of the particular record column with which the sensing means 13 is registered. Preferably, the dog elements on the clutch 26 and the drive gears 21 and 22 are so formed that the elements on one side of the clutch 26 are projected within the elements of one drive gear while the elements on the other side of the clutch are still engaged with the elements of the other drive gear, there being sufficient lost motion between the various individual dog clutch elements such that both gears cannot simultaneously be locked to the drive shaft 23. This construction is shown most clearly in Figures 5 and 6.

To provide means for preventing engagement of the brushes 14 with their associated contact plate on the machine during such time as an adjustment is being made to shift record columns, the sensing device is provided with an auxiliary supporting shaft 43 which is carried by the two arm members 44 which are pivoted at the opposite end upon the worm shaft 17. A gear train is provided between the worm shaft 17 and the auxiliary support shaft 43 so as to effect common rotation between the two, such gear train taking the form of a gear 45 fixed to the worm 17, an idler gear 46 carried by and journaled upon one of the arm members 44 and a gear 47 fixed to the auxiliary shaft 43.

Fixed to the opposite ends of the shaft 43 are cam members 48 each of which is provided with a constant radius cam surface throughout substantially its entire circumference with the exception of a sharply reduced and well defined portion 49 thereof, as shown most clearly in Figure 1. Support fingers 50 are engaged with the cams 48, these support fingers being rigid with the frame and supporting the sensing device in operative position only when they are engaged within the pockets 49 of the cam.

There is a 1:1 ratio between the drive shaft 23 and the auxiliary shaft 43 so that during the column shifting operation, the sensing means 13 will be pivoted upwardly into inoperative position and will be permitted to drop into its operative position only at the end of each shifting operation, a suitable spring 51 being provided for normally biasing the sensing means in its operative position.

It is of course to be understood that the operator of the machine can turn the crank 28 in either direction as he so desires in order to most quickly attain the positioning of the sensing means to the desired record column. The disk 42 and pointer 40, of course, enable the operator to at once determine which is the shortest path to the next desired record column.

The form of the invention shown in Figures 7–10 is identical in many respects to the mechanism previously described. In Figures 7–10, those parts of the machine which are identical to those previously described are provided with reference characters which are increased by 100 units over the corresponding element previously described.

In the modified form of the invention, the modified sensing unit 113 includes a plurality of analyzing pins 152, in the specific example shown, there being ten such analyzing pins for operating upon record decks having ten hole positions per column. Accordingly, each column may be punched by the single hole system, the machine as constructed in accordance with German Patent 394,559 being used for example. Since in the mechanical embodiment of Figures 7–10, the deck selection is effected by stopping the cards in different positions relative to the analyzing pins, the control of the sorting pockets can be effected in the same manner as is shown in the above German patent.

Of course, other systems may be used.

In Figure 7, it will be seen that deck selection is accomplished by means of one or the other of the stop pins 153 and 154 which are pivotally carried by the bar 155 which has integral therewith a medial depending portion 156 which is pivoted to a bar 157 which in turn is pivotally connected at its opposite end to fork member 129, the interconnection being at the point 158 which is below the pivot point 130 of the fork. Thus, as the bar 157 is shifted back and forth in accordance with the pivotal movement of fork 129, the member 155 will be tilted accordingly so that one or the other of the pins 153 and 154 will be uppermost. The pins 153 and 154 are guided within the sleeves 159 and 160 and the member 155 is constantly reciprocated through the medium of a lever 161 pivotally connected thereto as at 162 and engaged at its opposite end with an eccentric element 163 on a shaft 164 as shown most clearly in Figure 7.

The lever 161 is pivoted intermediate its ends upon a pin member 165 on the machine and the shaft 164 is driven in unison with the feed means of the machine so that the stop pins are constantly reciprocated with the angular disposition of the member 155 dictating which of the pivot pins will be projected into the path of movement of an advancing card 110. Only one of the pins 153 or 154 can be so disposed at a time, it being appreciated that the feed means for the cards is so constructed as to slip when the card is stopped at its proper position.

The transverse movement of the sensing means 113 is effected by a pair of worm shafts 166 and 167 upon which two nut members 168 and 169 are mounted, these nut members being connected to the sensing device 113. The sensing device itself consists of the previously mentioned analyzing pins 152 which are vertically guided within the bracket member 170 and which are engaged at their upper ends by pawl members 171 pivotally carried by the shaft 172. Suitable means are provided for resiliently urging the pawls against their associated analyzing pins.

The nuts 168 and 169 carry a plate member 173 having arm portion 173′ carrying the previously mentioned shaft 172, which plate has a sleeve 174 secured thereto, there being a pin 175 vertically slidable within such sleeve. The pin 175 is rigidly connected through the member 176 to the bracket 170 and the bracket itself has a pair of pins 177 and 178 at its opposite ends which project through elongate slots 179 in a pair of frame members 180. The frame members are interconnected at opposite ends by the straps 181 and these straps are provided with pin members 182 which journal the upper ends of the link members 183.

The previously mentioned shaft 164 has secondary eccentric elements 184 thereon which engage the lever 185 intermediate the ends thereof, which levers are pivoted at one end, as at 186, to the frame and at their opposite end, as at 187, to the links 183, see particularly Figure 8. Thus it will be seen that the frame elements 180 are constantly reciprocated, moving up and down once per card cycle. The frame elements 180 are guided by means of ways W fixed to the machine and which are straddled by saddle members S connected to the straps 181 interconnecting the frame elements.

The reciprocation of the frame members 180 imparts a similar movement to the bracket 170 and consequently the analyzing pins 152. During the downward movement of the bracket 170, the pins 152 will be pressed against the card 110 by the pawls 171 so that if there is a hole in the card beneath a particular pin, such pin will drop through at this spot. Extending transversely across the machine in registry below the various associated pins are a plurality of analyzing bars 188. Still assuming the downward movement of the sensing device 113, if a hole is in the card so that the pin 152 will drop therethrough, the associated pawl 171 will move downwardly such that its tip 189 will be projected into the recess 190 of the bracket 170 such that the downwardly moving bracket will carry the pawl with it and hence force the pin 152 to engage and depress its associated bar 188.

The various bars 188 are resiliently supported by a plurality of strap elements 191 which extend in the manner best shown in Figures 7 and 8 below spindles 192 and 193 and which have bearing members 194 journaling them thereon so that the spindles 192 and 193 serve as fulcrums for the members 191. The free ends of the members 191 engage over pin elements 195 which mount compression springs 196 for normally urging those ends of the elements 191 downwardly to thus fulcrum the associated bars 188 upwardly. A support member 197 carries a plurality of Bowden wire elements 198 which have their respective upper end portions 199 registered beneath and in engagement with the associated bars 188. These Bowden wire elements operate the pocket selectors in the conventional manner.

To aid in properly positioning the sensing unit, the worm shaft 167 may have a detent wheel 200 secured thereto with a detent spring 201 being mounted on the machine to engage in the detent of the wheel.

I claim:

1. In a machine controlled by multi-deck record cards, each deck consisting of a plurality of adjacent record columns, an analyzing device movably mounted on the machine common to all record columns and to all decks, deck selection means for selectively rendering said analyzing device responsive to a record column in the selected deck, manually operated column selector means connected to the analyzing device for positioning said analyzing device along the adjacent record columns of a deck, said column selector means including means for automatically reversing the positioning movement of said analyzing device at the end of a record deck, said deck selection means being operatively connected to said reversing means for actuation thereby.

2. A machine as specified in claim 1 wherein said reversing means include a reversing gear, said reversing gear being operatively connected to said deck selection means.

3. A machine as specified in claim 1 wherein said deck selection means include deck selection contacts rendering said analyzing means responsive only for the deck associated with the selected selection contact and wherein said reversing means include a reversing gear, said deck selection contacts being actuated in unison with said reversing gear.

4. A machine as specified in claim 1 wherein said deck selection means include deck selection stops arresting the card in different positions relative to the analyzing means and wherein said reversing means include a reversing gear, said deck selection stops being alternately actuated in unison with said reversing gear.

5. In a machine controlled by multideck record cards, each deck consisting of a plurality of adjacent record columns, sensing means including a plurality of elements adapted to engage a record card, means mounting said sensing means upon the machine and including manually operated column selector mechanism for moving said sensing means into alignment with a selected record column, said column selector mechanism including a drive shaft, a driven shaft and reversible gearing connecting the drive and driven shafts, means connected to the column selector mechanism for actuating said reversible gearing at the opposite ends of the path of travel of said sensing means, and means actuated in time relation with the last mentioned means for shifting the deck upon which said sensing device is operable.

6. In a machine controlled by multideck record cards, each deck consisting of a plurality of adjacent record columns, sensing means adapted to engage a record card, means mounting said sensing means upon the machine and including manually operated column selector mechanism for moving said sensing means into alignment with a selected record column, said column selector mechanism including a drive shaft, a driven shaft and reversible gearing connecting the drive and driven shafts, means connected to the column selector mechanism for actuating said reversible gearing at the opposite ends of the path of travel of said sensing means, and means actuated in time relation with the last mentioned means for shifting the deck upon which said sensing device is operable.

References Cited in the file of this patent

UNITED STATES PATENTS

| | | |
|---|---|---|
| 2,025,602 | Maul | Dec. 24, 1935 |
| 2,258,120 | Maul | Oct. 7, 1941 |
| 2,265,439 | Maul | Dec. 9, 1941 |
| 2,265,440 | Maul | Dec. 9, 1941 |
| 2,366,368 | Sundstrand et al. | Jan. 2, 1945 |
| 2,411,723 | Hauseman | Nov. 26, 1946 |